United States Patent
Weisswange et al.

(10) Patent No.: US 11,784,961 B2
(45) Date of Patent: Oct. 10, 2023

(54) SOCIAL INTERACTION OPPORTUNITY DETECTION METHOD AND SYSTEM

(71) Applicants: Honda Research Institute Europe GmbH, Offenbach/Main (DE); Sproutel Inc., Providence, RI (US)

(72) Inventors: Thomas Weisswange, Offenbach (DE); Jens Schmüdderich, Offenbach (DE); Aaron Horowitz, Providence, RI (US); Joel Schwartz, Los Angeles, CA (US)

(73) Assignees: Honda Research Institute Europe GmbH, Offenbach/Main (DE); Sproutel Inc., Providence, RI (US)

( * ) Notice: Subject to any disclaimer, the term of this patent is extended or adjusted under 35 U.S.C. 154(b) by 280 days.

(21) Appl. No.: 17/084,648

(22) Filed: Oct. 30, 2020

(65) Prior Publication Data
US 2022/0141173 A1 May 5, 2022

(51) Int. Cl.
*G06F 15/16* (2006.01)
*H04L 51/52* (2022.01)
*H04L 67/50* (2022.01)
*H04L 51/046* (2022.01)
*H04L 67/306* (2022.01)

(52) U.S. Cl.
CPC .......... *H04L 51/52* (2022.05); *H04L 51/046* (2013.01); *H04L 67/306* (2013.01); *H04L 67/535* (2022.05)

(58) Field of Classification Search
CPC ..... H04L 51/52; H04L 67/535; H04L 51/046; H04L 67/306
USPC ................................ 709/206, 204, 207, 217
See application file for complete search history.

(56) References Cited

U.S. PATENT DOCUMENTS

| | | |
|---|---|---|
| 5,835,861 A | 11/1998 | Whiteside |
| 8,380,804 B2 | 2/2013 | Jain et al. |
| 8,552,881 B2 | 10/2013 | Nylund |
| 8,904,295 B2 | 12/2014 | Whalin et al. |
| 9,019,077 B2 * | 4/2015 | Hazzani ............... H04L 67/52 340/8.1 |
| 9,323,826 B2 * | 4/2016 | Bailey .................... G06F 16/95 |
| 9,363,135 B1 * | 6/2016 | Merom ..................... H04L 9/40 |
| 9,386,052 B2 | 7/2016 | Ownbey et al. |
| 9,591,260 B1 | 3/2017 | Inkpen Quinn et al. |

(Continued)

FOREIGN PATENT DOCUMENTS

| | | |
|---|---|---|
| EP | 1457911 | 9/2004 |
| WO | 2014093477 | 6/2014 |

*Primary Examiner* — Kaylee J Huang
(74) *Attorney, Agent, or Firm* — JCIPRNET

(57) ABSTRACT

A method and corresponding system for improving an interaction process in a social network for a user with at least one other person is provided. The method comprises a step of, in a training phase, acquiring sensor data on at least a user state and interaction data on a social interaction of a human person with the at least one other person. The acquired sensor data and the interaction data is then analyzed in order to generate classifier data from the acquired sensor data and the acquired interaction data. In a subsequent application phase, the method acquires current sensor data on at least the user state of the at least one other person, predicts an interaction score for the user based on the acquired current sensor data and the classifier data, and generates an interaction identifier for the user for an interaction with the at least one other person in the social network based on the predicted interaction score.

20 Claims, 4 Drawing Sheets

(56) References Cited

U.S. PATENT DOCUMENTS

| | | | |
|---|---|---|---|
| 9,891,792 B1* | 2/2018 | Morin | G06N 20/00 |
| 2005/0021485 A1* | 1/2005 | Nodelman | G06Q 10/109 |
| | | | 700/44 |
| 2012/0191777 A1* | 7/2012 | Iwasaki | G06Q 10/10 |
| | | | 709/204 |
| 2013/0311470 A1* | 11/2013 | Lotfi | G06F 16/35 |
| | | | 707/737 |
| 2014/0161322 A1 | 6/2014 | Cheng et al. | |
| 2014/0229408 A1* | 8/2014 | Vijayaraghavan | G06F 16/353 |
| | | | 706/46 |
| 2016/0191446 A1 | 6/2016 | Grol-Prokopczyk et al. | |
| 2016/0366245 A1 | 12/2016 | Gupta | |
| 2018/0097909 A1 | 4/2018 | Possing et al. | |
| 2018/0253659 A1* | 9/2018 | Lee | H04L 51/42 |
| 2018/0285773 A1* | 10/2018 | Hsiao | G06N 20/00 |
| 2019/0130366 A1* | 5/2019 | Pell | G06F 16/24 |
| 2019/0163848 A1* | 5/2019 | McGranahan | G05B 23/0254 |
| 2021/0218607 A1* | 7/2021 | Ait Aoudia | H04L 27/04 |

\* cited by examiner

SOCIAL INTERACTION OPPORTUNITY DETECTION METHOD AND SYSTEM

TECHNICAL FIELD

The disclosure relates to a method and system for successfully facilitating social interaction between persons on a social network. In particular, the disclosure improves recommendation, initiation and acceptance of social interactions on social networks.

BACKGROUND

In recent years the use of computer devices and more recently, of mobile communication devices (smartphones or tablet computers), for the purpose of communication between people has significantly increased. Even more recent is the rapid increase of interpersonal communication within social networks. In social networks, users may actively share their current activities or other information via text messages, photos or even videos thereof. Users may also stream videos of their activities captured by means of a camera live to other persons concurrently active on the social network. However, such interactions on social networks presently require an initiative of the active user intending to share some content, both in timing of the interaction and in selecting the recipients on the social network of the interaction. On side of the recipients of the interaction, the other users have to actively acknowledge their consent to an involvement in the interaction, for example, by a communicative reply such as a "like".

Social networks may also implement approaches in which the user receives recommendations to communicate with other persons from within the social network. Generating such recommendations bases on an assumption of shared interests between the user and the other persons, or possibly on the detection of a certain activity of the user. However, known and currently implemented methods for generating such recommendation for a social interaction disregard actual circumstances of the other persons. The actual circumstances, for example, his availability due to being awake or currently actively engaging with his mobile communication device, might influence the actual interest of the other person engaging in an interaction on a specific topic with the user.

It is an object of the present disclosure to provide technical solutions in order to improve recommendation quality, initiation and acceptance of interactions on social networks.

SUMMARY

The present disclosure provides a social interaction opportunity detection method and system.

A first aspect of the disclosure concerns a method for improving an interaction process in a social network for a user with at least one other person. In a training phase, the method comprises steps of acquiring sensor data on at least a user state and related interaction data on a social interaction of the user with the at least one other person, and of analyzing the sensor data and the interaction data to generate classifier data based on the acquired sensor data and the acquired interaction data. In an application phase, the method acquires current sensor data on at least the user state of the at least one other person, predicts then an interaction score for the user based on the acquired current sensor data and the classifier data generated in the training phase, and then generates an interaction identifier for the user for an interaction with the at least one other person in the social network based on the predicted interaction score.

A program according to a second aspect comprises program-code means for executing the steps according to any of the preceding exemplary embodiments, when the program is executed on a computer or digital signal processor.

A system for improving an interaction process in a social network for a user with at least one other person according to the third aspect comprises a data acquisition interface for acquiring sensor data from a plurality of sensors, a processor (computing unit) and a memory (storage unit), and a human interaction interface, wherein the data acquisition interface is configured to acquire the sensor data on at least a user state and interaction data on a social interaction of a human person with the at least one other person. The processor, or a plurality of processors is configured to analyze the sensor data and the interaction data to generate classifier data from the acquired sensor data and the acquired interaction data. The processor stores the generated classifier data in the memory. The processor is further configured to acquire current sensor data on at least the user state of the at least one other person via the data acquisition interface, to predict an interaction score for the user based on the acquired current sensor data and the classifier data stored in the memory, and to generate an interaction identifier for the user for an interaction with the at least one other person in the social network based on the predicted interaction score.

BRIEF DESCRIPTION OF THE DRAWINGS

The disclosure is now explained in more detail with reference to the accompanying drawing, wherein.

DETAILED DESCRIPTION

Figure 1:
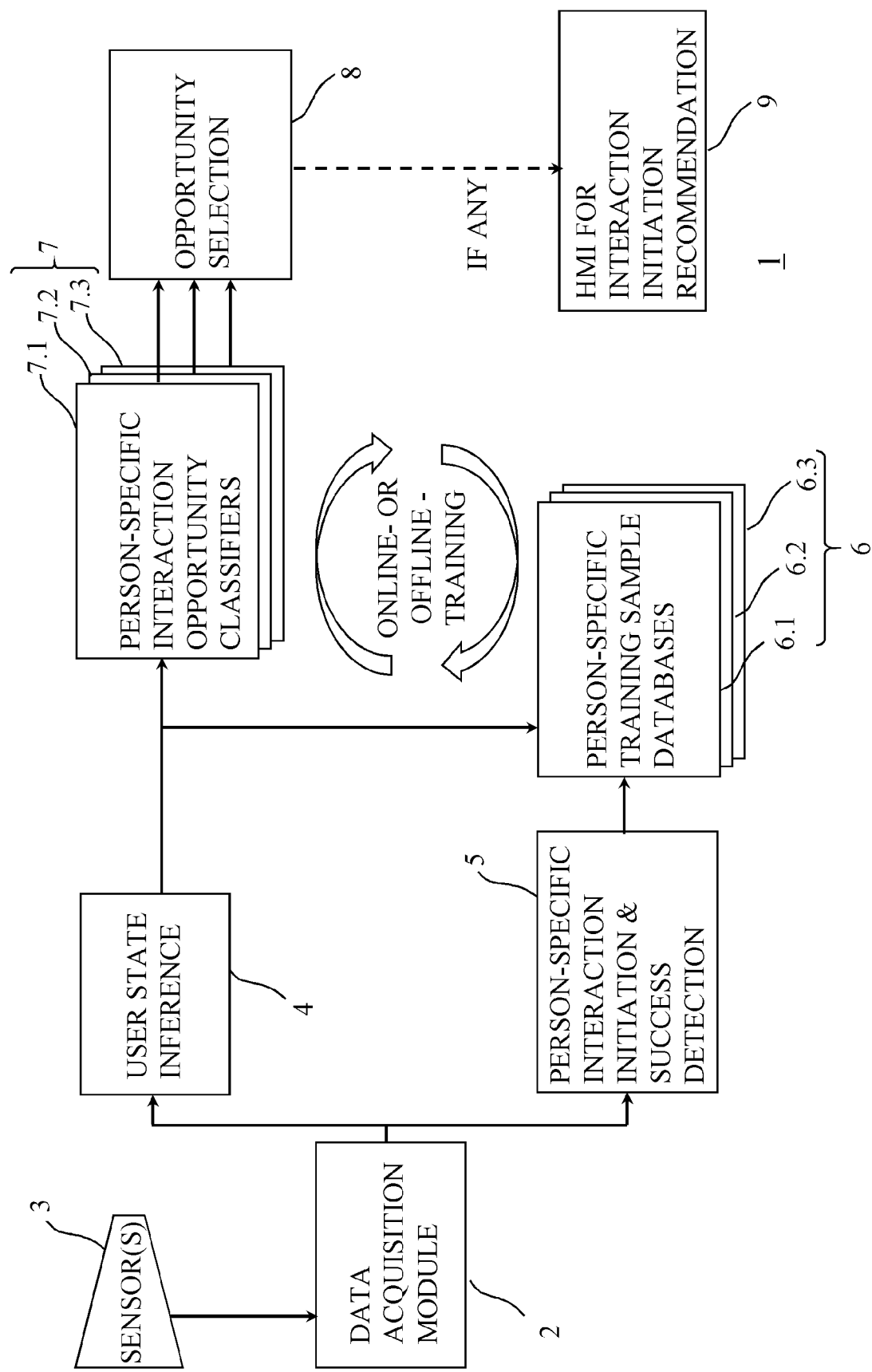
FIG. 1 shows a functional system overview according to an exemplary embodiment of the present disclosure.

This problem is solved by the method according to the first aspect, the program according to the second aspect, and the system according to the third aspect of the disclosure.

The dependent claims define further exemplary embodiments of the disclosure.

The first aspect of the disclosure concerns a method for improving an interaction process in a social network for a user with at least one other person. In a training phase, the method comprises steps of acquiring sensor data on at least a user state and related interaction data on a social interaction of the user with the at least one other person, and of analyzing the sensor data and the interaction data to generate classifier data based on the acquired sensor data and the acquired interaction data. In an application phase, the method acquires current sensor data on at least the user state of the at least one other person, predicts then an interaction score for the user based on the acquired current sensor data and the classifier data generated in the training phase, and then generates an interaction identifier for the user for an interaction with the at least one other person in the social network based on the predicted interaction score.

Classifier data defines one or a set of classifiers used for prediction of the interaction score. In the context of the present disclosure, classifier data may relate to a correlation between determined user states of a person, on the one hand, and the person's presumed availability and willingness for a specific interaction on the other hand.

The user state may be derived directly from the sensor data. The sensor data may include at least one sensor reading. For example, the sensor reading maybe a global navigation satellite system (GNSS) location signal, a TV signal or a video signal, or a motion detection signal. Alternatively, the user state may be determined based on a mapping, in particular a learned mapping from acquired sensor data from at least one, preferably a plurality of sensors, to a corresponding user state. Alternatively or additionally, the user state may be inferred based on image or video sensor data depicting the person as currently performed in known state-of-the-art approaches for activity recognition. Additionally or alternatively, the user state may be determined from a complex reasoning taking acquired previous user states of the person into account, for example based on a state machine or a Markov process or learned patterns on user behavior of the person, for example over the course of a certain observation time.

The generated, in particular learned and stored, classifier data enables to predict (calculate) the interaction score for the user. This interaction score regards the current user state of the at least one other person, and in combination with the generally available interactions on the social network, the interaction score is a decision measure for selecting a specific and currently suitable interaction, which is then unambiguously identified by the generated interaction identifier.

With the present disclosure, a framework is generated, which enables to implement a method for generating recommendations for interactions in a social network that takes the state of both the user and the at least one other person collaborating in the interaction into account. This regards, for example, if the other person is currently prepared or willing to engage in the envisaged interaction on this certain topic with the initiating user. Known approaches for generating recommendations for an interaction on a social network detect if the person would be available for the interaction by either probing if the person is present at a computing device suited for the interaction, and/or if the person is actually not engaged in another prohibiting interaction, for example, if the person is currently taking a phone call. Contrary thereto, the disclosure trains a classifier enabling the user to initiate a communication interaction with a convenient timing for both the initiating user and the receiving other person by correlating performed activities and known availabilities of, for example, both the initiating user and the receiving other person, and detect mental states of both initiating user and the receiving other person and with past initiated and accepted interactions from the training phase of classifier.

The results concerning quality and successfully initiating/accepting social interactions achieved based on the trained classifier data exceed the results achievable by awareness displays as presently known. Known awareness displays provide direct information on the receiving person's current situation, for example, by providing video or still image of the receiving person, its localization or a similar direct information, which might have strong privacy implications and furthermore entirely relies on an interpretation by the initiating user.

Known communication tools like messenger services implemented in social networks allow blocking of other users or limiting the type of interaction initiation during a certain time. These available settings for existing messenger services are to be selected manually, are inherently static, and currently do not allow to combine features such as allowing a certain communication interaction with a certain other person only at certain points in time. Contrary thereto, the method allows to detect a variety of aspects of a user's state, for example, a location, an activity, and an emotion of the user by using a set of sensors and the processor (computing unit) in combination with interaction data, such as information on previously executed initiations, acceptances, and rejections of initiated social interactions. The method combines this with information identifying other persons and learning correlations between both aspects, a user state on the one hand and interaction data on the other hand, by learning classifier data. The classifier data enables to automatically predict, to recommend, or even initiate a suitable interaction to the user in the social network.

The acquired sensor data and current sensor data may comprise at least one of user location, user activity, and user emotion.

These instances of sensor data are already widely available from current sensors and allow inferring a person's user state, while simultaneously these sensor data may influence the initiation and acceptance of an interaction on a social network. Thus, quality of interaction recommendations will be improved.

In the method according to an exemplary embodiment, the acquired interaction data includes at least one of information on past initiated interaction(s) on the social network, past acceptance(s) of an initiated interaction on the social network, and past rejection(s) of an initiated interaction on the social network.

The initiation of a social interaction might be detected by analyzing the current activity of a smartphone, for example, a phone call or a messenger communication, by acquiring sensor data on both the user and the other person, for example, by near location positions provided by GNSS sensors for the user and the other person, or by sensor data from external sensors, for example, microphone-based detection of a dialogue.

A rejection of an interaction might be inferred from an unanswered or aborted phone call, a short duration of an interaction in form of a chat, for example, only few words in the chat or only a short time duration of the chat, missing responses within a certain time period, or by emotion detection based on voice or face features of the person recorded by sensors such as a camera or microphone. The camera or microphone may form part of a smartphone associated with the user or the at least one other person.

Thus, a quality of the recommended interaction can be improved by taking interaction history of the user and the at least one other person into regard during the training phase of the method.

An exemplary embodiment of the method comprises, in the steps of analyzing the sensor data and the interaction data, learning a correlation between the acquired sensor data and the acquired interaction data for generating the classifier data.

In an exemplary embodiment, acquiring sensor data comprises acquiring sensor data on the user state and further acquiring sensor data on the user state of the at least one other person. In the application phase, acquiring current sensor data comprises acquiring sensor data on the current user state and further acquiring sensor data on the current user state of at least one other person.

Thus, a high probability for initiating an interaction by the user and for accepting the proposed interaction by the at least one other person is achieved. The acceptance of recommended interactions and of a system implementing the method is increased.

The method may, in the step of acquiring sensor data, acquire the sensor data from at least one sensor forming part of a wearable device, for example, a smart watch, a mobile processing device, for example, tablet computer, a mobile communication device, for example, a smartphone, and a smart home system.

Therefore, the method relies on instances of sensor data readily available. The cost for implementing the method are accordingly not increased by further sensors. An acceptance of an implementation of the method by users is high, as the sensors concerned by the disclosure are already existing and present sensor devices.

The predicted interaction score according to an exemplary embodiment includes at least a binary prediction value or a confidence value for a predicted interaction to occur.

The interaction score according to the method provides a measure for a successful recommendation. The interaction score represents a measure which is to be processed further efficiently for determining, for example, selecting a suitable interaction out of a plurality of available interactions on the social network. The interaction score may be processed further using one or more thresholds or as a selection criterion for selecting from a plurality of alternative interactions.

The classifier data in an exemplary embodiment may comprise a learned classifier each for the user and each other person, wherein the learned classifier determines an interaction initiation success for the user and the other person.

The classifier data in this exemplary embodiment thus comprises a classifier for each pair of persons and is valid for this pair of persons only. This may include a specific classifier for the person as an initiator of the interaction and a specific classifier for the user as a recipient (addressee) of the interaction. Alternatively, the classifier may be a role-independent classifier. A role independent classifier is a classifier, which applies equally to the user acting as the initiator of the interaction and acting as the recipient of the interaction.

The learned classifier may determine an interaction initiation success or an interaction acceptance success for the user and the other person.

In the method according to an exemplary embodiment, the acquired sensor data in the training phase includes further sensor data on the at least one other person's state and/or global information, and in the application phase, the acquired current sensor data includes further sensor data on the at least one other person's state and/or current global information.

Global information may include information about time, date, season, weather, and temperature.

Alternatively, a symmetric opportunity detection for an interaction the social network could be performed. The symmetric opportunity detection performs an individual detection for a recommended interaction for each the user and the other person, and then subsequently combines the results of each individual detection to generate a symmetric opportunity detection.

Both, the symmetric opportunity detection as well as including further sensor data on the at least one other person's user state provides the effect of a high probability of a successful social interaction.

This particular instance of mutual opportunity detection concerning both the initiating user and another person as interaction recipient enables to identify a combination of user states of the user and the other person that are particularly favorable for successful mutual communication interaction.

The method according to an exemplary embodiment, comprises, in the training phase steps of generating a generic model, learning an adaptation function based on the generic model and acquired sensor data on at least the user state and interaction data on a social interaction of the user with the at least one other person. In the step of analyzing the sensor data, the method generates the classifier data based on the learned adaptation function and the generic model.

The generic function enables to provide basic classifier data valid and suitable for a group of the user and other persons as group members, and then adapting the generic model to the individual user as a member of this group, for example, as more training data for the individual user becomes available during an application phase.

The method according to an exemplary embodiment may perform the steps of acquiring sensor data and analyzing the acquired sensor data in the training phase offline, and store the acquired sensor data and the learned classifier data offline.

The learning phase requires high processing resources for generating the classifier data, for example, by machine learning and is particularly suited for a server- and cloud-based implementation. The application phase benefits from the generated and stored classifier data from the learning phase and may then be implemented for running on a smartphone with only modest processing capabilities.

The method according to an exemplary embodiment performs the steps of acquiring sensor data and analyzing the acquired sensor data in the training phase online, and updates the classifier data based on at least the acquired current sensor data and the acquired current interaction data.

The method according to an exemplary embodiment performs a step of analyzing the acquired current sensor data to generate updated classifier data by unsupervised learning, in particular by clustering-based learning.

Thus, a continuous updating and learning of the classifier data is possible, benefitting from a continuous availability of further training data in the form of the acquired current sensor data and current interaction data during the application phase. This further training of the classifier to generate updated classifier data may be used by performing an unsupervised learning algorithm, in particular clustering-based learning.

The method according to an exemplary embodiment, comprises performing a step of analyzing the acquired current sensor data to generate updated classifier data by an active learning method, in particular reinforcement learning.

Performing active learning in order to generate further improved updated classifier data is particularly advantageous when the user is involved in the additional training during the application phase, for example via specifically adapted human-machine interface (HMI). The updated classifier data may provide interaction recommendations, which can be expected to meet a high degree of acceptance by the user.

The method according to an exemplary embodiment comprises, in the application phase, a step of predicting a future user state of the user and/or a future user state of the at least one other person. The step of predicting predicts the interaction score for the user based on the acquired current sensor data, the classifier data, and further based on the predicted future state.

The classifier data may yield particular good results for an initiated interaction based thereon, when forthcoming states of the user and the at least one other person are taken into regard when determining an interaction score and the interaction identifier are based thereon. Initiating and accepting of the interaction by the user and the other person will depend on decisions of the user and the other person regarding expectations and assumptions for the future.

The method according to an exemplary embodiment comprises a step of providing, to the user, an interface presenting learned classifier data and accepting a user feedback on the output learned classifier data, and/or a step of providing, to the user, an interface for inputting further classifier data, and/or a step of providing, to the user, an interface for specifying at least one other person for which an interaction identifier is to be generated based on classifier data.

The user may therefore be directly involved in updating the classifier data and thus acceptance of system implementing the method will be increased.

The method according to an exemplary embodiment may comprise a step of outputting, to the user, an interaction recommendation based on the interaction identifier, or initiating directly an interaction between the user and the at least one other person on the social network.

The method according to an exemplary embodiment further comprises a step of estimating a current user state based on the acquired current sensor data at a local processing device or at a remote processing device linked to the local processing device via a cloud service.

The method according to an exemplary embodiment stores the classifier data in a memory of the local processing device associated with the user, in a memory of the processing device associated with at least one other person or a server memory of the remote processing device.

The method according to an exemplary embodiments shows the classifier data differentiating between different types of interactions in the social network. The types of interaction include at least one of an interaction duration, an interaction content, an interaction target, and a communication service (messenger service).

The method according to an exemplary embodiment shows the interaction in the social network as an interaction of the user with a group of persons including the user and plural other persons as group members. The exemplary embodiment of the method acquires in the step of acquiring sensor data on at least the user state and the interaction data, sensor data and interaction data on interactions between the group members. In the step of analyzing the sensor data and the interaction data, classifier data for interactions between the group members of the group is generated based on the acquired sensor data and interaction data for group members. In the step of analyzing the sensor data and the interaction data, a pooling function which defines a mapping from the interaction scores of the group members to the interaction score of the user is generated. In the step of predicting the interaction score for the user, the interaction score is generated based on the acquired current sensor data, the classifier data and further based on the pooling function.

This exemplary embodiment searches opportunities for interactions, which specifically take the common habits and characteristics of a group of people into regard. A high level of satisfaction with the resulting initiation and acceptance of the resulting interactions within the group may be expected.

The method according to an exemplary embodiment is configured to perform the steps of predicting an interaction score and of generating an interaction identifier locally at the user's processing device and provides the interaction score and/or the interaction identifier to a processing device associated with the other person for initiating an interaction.

Providing the interaction score and/or the interaction identifier to a processing device associated with the other person may be performed directly via point-to-point (peer-to-peer) communication between the two processing devices of the user and the other person.

Alternatively, the method performs the steps of predicting an interaction score and of generating the interaction identifier by using a remote processing device and provides the predicted interaction score and the generated interaction identifier to the processing device associated with the user for initiating an interaction. This distributed processing corresponds to executing the method steps via cloud computing and pushes the results of the method step to the processing device of the user for initiation of the interaction.

Thus, the processing resources of the mobile and less capable processing device of the user are burdened only with the tasks of interfacing with the user, while the more sophisticated method steps referring to data analysis, machine learning, storing of databases, etc. are outsourced into a computing cloud. An advantageous distribution of workload is achieved.

Yet alternatively, the method performs the steps of predicting the interaction score and of generating the interaction identifier locally at the user's processing device based on sensor data provided by a processing device associated with the at least one other person.

A program according to the second aspect comprises program-code means for executing the steps according to any of the preceding exemplary embodiments, when the program is executed on a computer or digital signal processor.

The method steps of the method according to the first aspect are well suited for implementing in form of a computer program (also: application program, or: app) comprising one or more program modules.

A system for improving an interaction process in a social network for a user with at least one other person according to the third aspect comprises a data acquisition interface for acquiring sensor data from a plurality of sensors, a processor (computing unit) and a memory (storage unit), and a human interaction interface, wherein the data acquisition interface is configured to acquire the sensor data on at least a user state and interaction data on a social interaction of a human person with the at least one other person. The processor, or a plurality of processors is configured to analyze the sensor data and the interaction data to generate classifier data from the acquired sensor data and the acquired interaction data. The processor stores the generated classifier data in the memory. The processor is further configured to acquire current sensor data on at least the user state of the at least one other person via the data acquisition interface, to predict an interaction score for the user based on the acquired current sensor data and the classifier data stored in the memory, and to generate an interaction identifier for the user for an interaction with the at least one other person in the social network based on the predicted interaction score.

The system according to an exemplary embodiment is part of a communication device, in particular a smartphone, a tablet computer, or a smart home device. Alternatively or additionally, the system is integrated into a smart home system.

Preferably, the acquisition interface acquires data from a plurality of digital devices such as wearable devices, for example smart watches, or mobile communication devices, such as smart phones, or other smart home devices, such as TV sets, refrigerators, or smart speakers.

Same or corresponding features are denoted in the figures by the same reference signs.

FIG. 1 shows a functional system overview according to an exemplary embodiment of the present disclosure. The functional system overview of the system 1 for improving an interaction process in a social network is simplified and emphasizes key modules and their functions. The system 1 may be implemented in form of software running on one or more processors, microprocessors, which may be collectively referred to as a computing unit. The functional structure of the system 1 as presented in FIGS. 1 and 2 applies equally to a software implementation and hardware implementation, and does in particular not anticipate a specific distribution between hardware components and software components.

The system 1 acquires via its data acquisition interface 2 sensor data and interaction data. The data acquisition interface 2 may be implemented by a single data acquisition module or plural data acquisition modules. The data acquisition interface 2 acquires sensor data from a plurality of sensors 3. The sensors 3 are a main data source of the system 1. Examples for the sensors 3 used for providing sensor data may include virtual sensors that communicate the usage state of an electronic communication device and/or of installed software via a communication channel to the data acquisition interface 2.

The electronic communication devices can include mobile phones, tablet computers, notebooks, stationary personal computers (PCs), TVs, wireless radio sets, wearables such as smart watches or any other smart device, for example smart household devices, such as smart refrigerators.

The communication channel may differ between different sensors 3. The communication channel may include wireless, wired or fiber-optic networks based on communication protocols such as wireless local area networks (WLAN), wireless personal area networks (WPAN), Bluetooth, Zig-Bee, DALI, Ethernet, or technologies such as infrared (IR) or visible light communication (VLC).

The sensor data acquired by the data acquisition interface 2 may include data on a usage state of the electronic communication device. Usage states may include an ON state, and OFF state, a STANDBY state of the electronic communication device, or a device associated with the electronic communication device. Further examples for usage states include an active phone call, a rejected phone call, an active software application, a selected TV channel or a selected radio channel, an open refrigerator door, a selected program for an oven, a selected program for a washing machine, or for a dryer. A usage state may include a state of window blinds, sun shades or room dividers. A usage state may include a text typing input on any type of text input device of the electronic communication device, and/or a web browsing history of an electronic communication device connected to a network, for example the internet (world wide net) or an intranet. The usage state may include a spoken language input on any type of smart speaker as a further example of the electronic communication device.

The sensor data acquired by the data acquisition interface 2 may include sensor data acquired from static sensors 3 installed in an environment, for example, in a smart home setting. This may in particular include motion sensors, presence detecting sensors, temperature sensors, humidity sensors, ambient light sensors, sound sensors, gas sensors, surveillance cameras, ON/OFF-switches, and dimming switches.

The sensor data acquired by the data acquisition interface 2 may include sensor data acquired from mobile sensors 3 included in autonomous devices (robotic devices) moving around an environment, for example a cleaning robot, a lawn-mowing device or a camera-equipped autonomous device.

The sensor data acquired by the data acquisition interface 2 may include sensor data acquired from sensors 3 on wearable devices, for example smart watches, smartphones or smart clothing. The sensors 3 can include cameras, microphones, and attention-detection (focus-detection) sensors.

The sensors 3 may be implemented in hardware, or in software or the sensors 3 include both hardware and software. For example, an attention detection sensor may use image data from a camera observing the user of an electronic device and detect the user's focus of attention, for example, by using software for determining view direction and eye focus of the user from image data obtained by the camera.

The sensors 3 may include different sensor types such as optical sensors, for example cameras, 3D cameras, infrared (IR) cameras or active cameras, which may be adjusted with respect to pan angle, tilt angle or focus (zoom).

The sensors 3 may include sensor types acquiring physiological sensor data on a human person, for example skin conductance sensors, electromyography (EMG) sensors, electro-encephalography (EEG) sensors, electrodes, optical heart beat sensors, and temperature sensors.

The sensors 3 may include sensor types such as magnetic switch sensors, proximity sensors, for example based on ultrasonic principles, motion sensors, for example based on optical sensing, or pressure sensors, for example based on piezo-electric sensing principles.

The acquired sensor data is provided to a user state inference module 4. The user state inference module 4 determines a user state of a person (user) based on the acquired sensor data. In particular, the user state inference module 4 may use sensor data from a combination of sensors 3, preferably a diverse combination of sensors 3, which acquire sensor data based on different technical principles, to infer a user state therefrom.

Determined user states (inferred user states) may be defined by information on performed activities of the person. Performed activities of the person may include "cooking", "eating", "watching TV", "reading", "knitting", "playing games", "doing sports", "meeting people", "driving in car", "traveling by public transport", "studying", "looking at pictures of people", "browsing internet", "shopping".

Determined user states may be further defined by additional information in more detail. For example, user state "cooking" or "eating" may be specified by including the dish, which is actually cooked or eaten. User state "watching TV" may further defined by including information on the channel or the watched content. The user state "traveling by public transport" may be further defined by means of transport, for example by train, bus plane, or ship, and/or a destination, and/or a traveling speed.

Determined user states may be defined by information on an emotional state of the person. Examples for an emotional state of the user are "happy", "aroused", "bored", "relaxed", "captivated", and "stressed".

Determined user states may be defined by information on a physiological state of the person. Examples for a physiological state of the user are "sleeping", "awake", "exhausted", "active", "cold", "hot", and "mentally loaded".

Determined user states may be defined by information on a current location of the person, both within a building, for example, in an apartment of the person, or outside a building or in a public area, for example, in a vehicle, or at a parking area. Determined user states may be defined by information not only on the current location of the person alone, but also information on person-to-person location-related distances.

Determined user states may be defined by information on object-related states of the personr, for example "person carries phone", "person is separated from his phone", "person has both hands occupied by holding something in his hands", or "person is close to a video chat device associated with the person".

Determined user states may be defined by information on a history of user states of the person. A history of user states may include a history of activities the person performed, for example, including activities since a time of a last social interaction. A last social interaction may relate to a general last social interaction with any human person, or a last social interaction with a specific person. Information on the history of user states may include information on an elapsed time after returning home, a duration of work activity on specific day.

Determined user states may be defined by information on user preferences of the person. User preferences can, for example, include a preferred food, a preferred sport, and a favorite sports team.

Determined user states may be defined by information derived from calendar information concerning the person. User calendar information may include the user's birthday, planned attendance at a meeting in x hours from now, or the person's planned holidays.

The system further provides the acquired sensor data and interaction data to an interaction initiation and success detection module 5. The initiation and success detection module 5 is a person-specific module, which determines for a specific person (user) specific social interactions on the social network and acquires information on interaction parameters of the social interaction, for example interaction start time, interaction end time, interaction duration, and interaction type. Interaction type may refer to text message, sharing picture, video chat. The interaction initiation and success detection module 5 detects (determines) the interaction parameters.

The interaction initiation and success detection module 5 provides the interaction data to a person-specific training sample database 6. The person-specific training sample database 6 further receives the user state inference data, which is also person-specific (user specific). The person-specific training sample database 6 generates and stores sets of training samples including the data on user states (user state data) associated with the interaction data and further associated with the interaction participants.

For example, the person-specific training sample database 6 associated with the user (person A) comprises a first set of training samples 6.1 including interaction data and related user state data for interactions and user states involving a first person B. The person-specific training sample database 6 associated with the user (person A) further comprises a second set of training samples 6.2 including interaction data and related user state data for interactions and user states involving a second person C. The person-specific training sample database 6 associated with the user (person A) further comprises a third set of training samples 6.3 including interaction data and related user state data for interactions and user states involving a third person D.

The person-specific training sample database 6 thus comprises the sets of training data samples 6.1, 6.2, 6.3, which form the basis for the training phase of the system 1. During the training phase, the interaction opportunity classifier module 7 learns the person-specific interaction opportunity classifiers 7.1, 7.2, 7.3 based on the training data samples 6.1, 6.2, 6.3.

In particular, the interaction opportunity classifier module 7 learns the person-specific interaction opportunity classifier 7.1 for an interaction between the user (person A) and the first person B. Furthermore, the interaction opportunity classifier module 7 learns the person-specific interaction opportunity classifier 7.2 for an interaction between the user and the second person C. Furthermore, the interaction opportunity classifier module 7 learns the person-specific interaction opportunity classifier 7.3 for an interaction between the user and the third person D.

The training of the first, second and third person-specific interaction opportunity classifiers 7.1, 7.2, 7.3 may be performed as online training. Alternatively, the training by the interaction opportunity classifier module 7 can be performed via offline training. After performing the training phase, the interaction opportunity classifier module 7 has trained classifier data at its disposal. In particular, the interaction opportunity classifier module 7 has classifier data comprising the trained set of person-specific interaction opportunity classifiers 7.1, 7.2, 7.3.

The interaction opportunity classifier module 7 can store the trained classifier data for use in an application phase of the method for improving social interaction in a social network.

In the application phase, the system 1, in a particular the data acquisition module 2 acquires current sensor data from the sensors 3. The current sensor data corresponds in its aspects to the sensor data acquired in the training phase from the sensors 3. The acquired current sensor data is acquired for a current point in time.

The user state inference module 4 obtains the acquired current sensor data and infers a current user state based on the acquired sensor data. The user state inference module 4 then provides the inferred current user state to the interaction opportunity classifier module 7, which has the trained classifier data at its disposal.

In the application phase, the interaction opportunity classifier module 7 predicts an interaction score for the user based on the acquired current user state and based on the classifier data generated in the training phase. The interaction score is provided to the opportunity selection module 8.

The interaction score can be a parameter, which enables to select a specific social interaction with one or more other persons on the social network for a specific time out of a plurality of available social interactions, a plurality of persons and a plurality of times. For example, the interaction score may include a binary parameter, a set of binary parameters or a probability distribution or a set of probability distributions.

The opportunity selection module 8 generates an interaction identifier for the user based on the predicted interaction score obtained from the interaction opportunity classifier module 7.

The interaction identifier may specify a specific social interaction of the user A with one or more other persons B, C, D on the social network set at a specific time. The interaction identifier corresponds in a special case to a recommendation "no social interaction recommended", when the opportunity selection module 8 determines this as the recommended course of action based on an evaluation of the interaction score provided from the interaction opportunity classifier module 7.

The opportunity selection module 8 provides the generated interaction identifier to a human interaction interface 9 (HMI). The HMI 9 may output to the user A a recommendation for a social interaction on the social network based on the interaction identifier provided by the opportunity selection module 8. Alternatively or additionally, the HMI may initiate the social interaction on the social network based on the received interaction identifier.

The HMI 9 may in a particular present a message to the user including a prompt for the user A to communicate with one or more other persons B, C, D, which are also users of the social network. The message may include an indication of the at least one other person B, C, D with which a social interaction is recommended. The HMI 9 may display the prompt to the user A, or an indication, for example an icon, that a prompt is available.

Alternatively or additionally, message may be sent to a messaging server of the social network. The message may be configured to initiate a social interaction between the user A and the at least one other person B, C, D, of the social network. The initiated social interaction may be a message initiated within a messaging app of the social network, or a social networking app or another suitable app, or website on a network (internet, intranet). An initiation message may be addressed to the at least one other person B, C, D, and may include one or more media data items, such as image data, for example GIFs, animated GIFs, audio data, video data, links or other suitable content. The initiation message may include an element enabling the at least one other person B, C, D as addressee of the initiation message to accept the recommended social interaction, for example via a return message, when receiving the initiation message.

Figure 2:
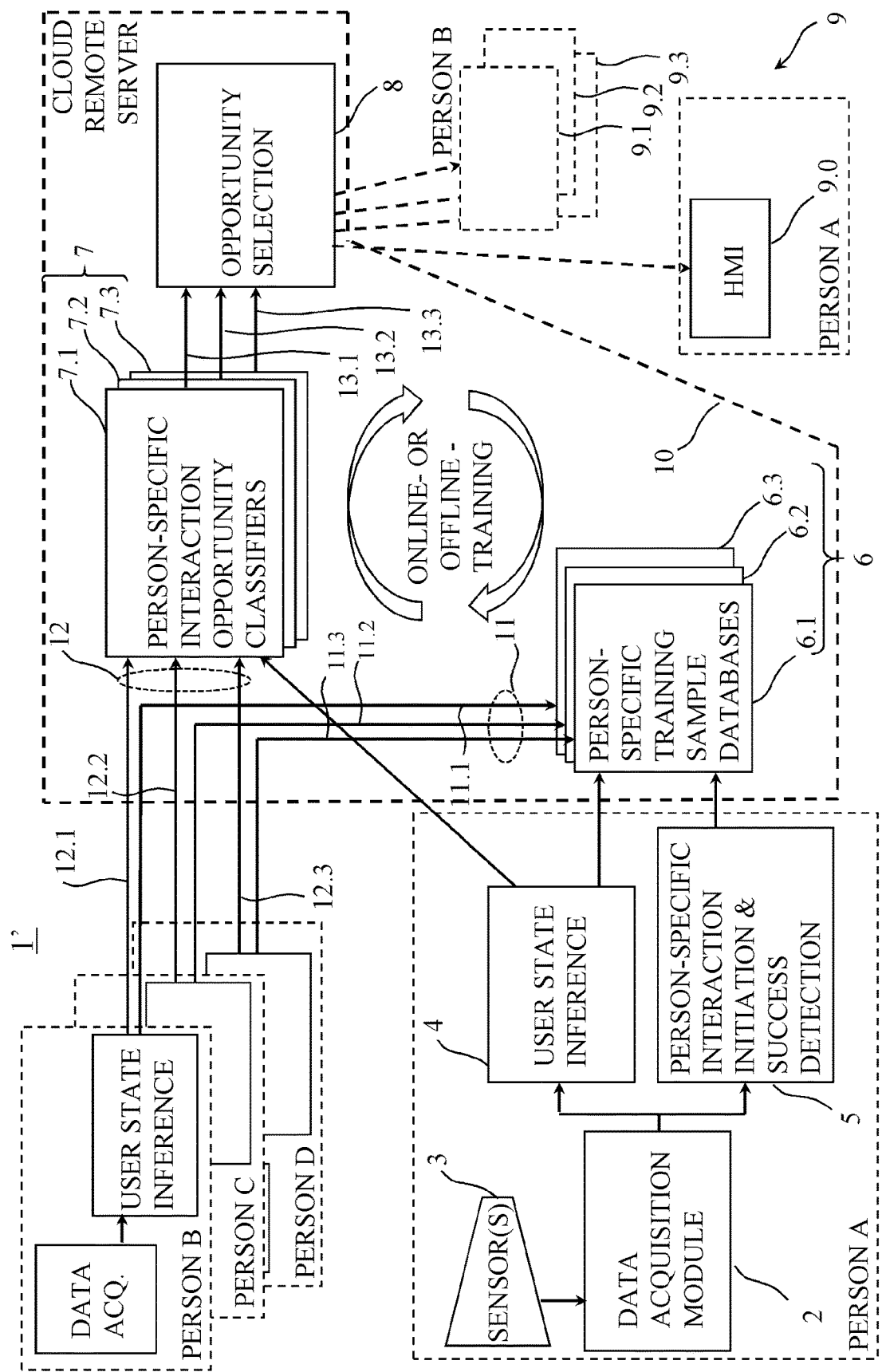
FIG. 2 shows a further functional system overview according to an exemplary embodiment of the present disclosure.

FIG. 2 shows a further functional system overview according to an exemplary embodiment of the present disclosure. The system 1' depicted in FIG. 2 extends the system 1 by including person-specific training sample databases 6.1, 6.2, 6.3 of a plurality of persons A, B, C, D. The system 1' for improving an interaction process in a social network performs mutual opportunity detection process.

Most features of the functional system overview of the system 1' depicted in FIG. 2 correspond to features of the system 1 discussed with reference to FIG. 1. Therefore, for corresponding features, references to the discussion of FIG. 1 and system 1 is considered sufficient for sake of conciseness. System 1' improving an interaction process in a social network shows mutual opportunity detection for a plurality of persons, namely person A corresponding to the user, and, for example, (first) person B, (second) person C, and (third) person D.

Mutual opportunity detection for a plurality of persons may also be performed in a slightly differing processing distribution in an arrangement of processing units (processors, servers) connected via a network 10. Nevertheless, the system architecture of system 1 as indicated in FIG. 1 and of system 1' as indicated in FIG. 2 are not limited to the corresponding application examples, and may be exchanged with each other, for example.

The network 10 may include one or more networks suitable to interconnect plural processing units, for example a local area network (LAN) or a wide area network (WAN). The network 10 may be a world-wide network, the internet, or an intranet such as a company-wide net.

System 1' comprises a plurality of personal electronic communication devices, each electronic communication device is associated with one person A, B, C, D. Each of the personal communication devices includes at least a data acquisition module 2, one or more sensors 3, a user state inference module 4 and person-specific interaction initiation and success detection module 5.

Additionally, the electronic communication devices each include an associated HMI 9 for outputting information to the person A, B, C, D and/or receiving an input from the person A, B, C, D.

FIG. 2 does not depict communication modules of the electronic communication devices for performing communication based on at least one communication standard. The communication modules enable a communication between the electronic communication devices, from the electronic communication devices to a server 19. The server 19 may access a data storage device (memory) 20 for storing data to the data storage device 20 and reading data from the data storage device 19.

Figure 4:
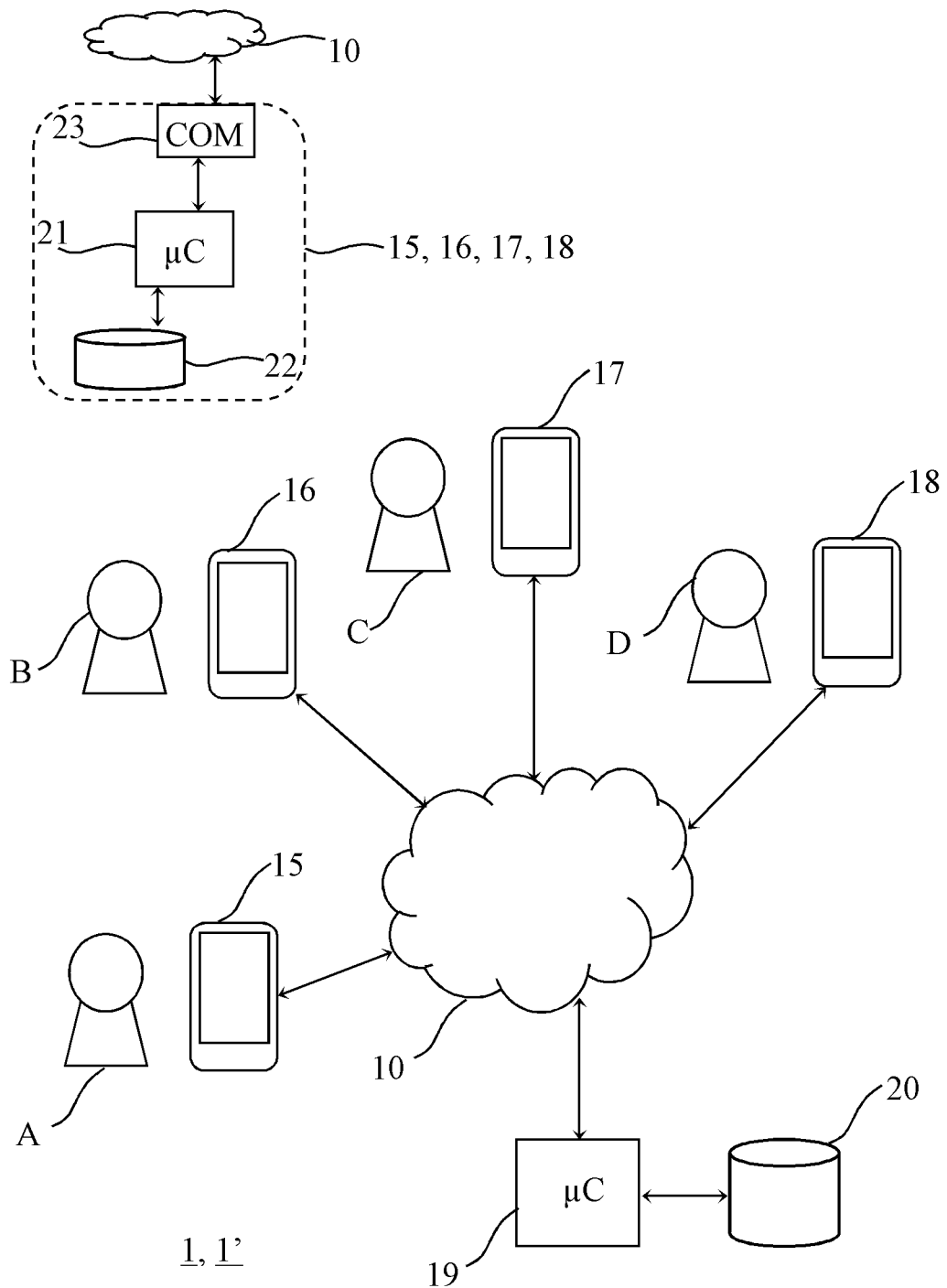
FIG. 4 shows an exemplary structure of the system according to an exemplary embodiment of the present disclosure.

System 1' shown in FIG. 2 arranges the more complex data processing in a cloud, in particular on at least one remote server, such as server 19 and data storage device 20 in FIG. 4. This is advantageous for mutual interaction opportunity detection according to the system 1', which uses more comprehensive person-specific training sample databases 6.1, 6.2, 6.3 of a plurality of persons A, B, C, D for the learning phase in order to train the person-specific interaction opportunity classifiers 7.1, 7.2, 7.3. The person-specific interaction opportunity classifiers 7.1, 7.2, 7.3 are also of a more complex structure than the classifier data of system 1. The person-specific training data samples 6.1, 6.2, 6.3, which each combine person-specific interaction data from the user (person A) with user state data from the user and further user state data from one further person B, C, D.

The person-specific training sample database 6 obtains via the network 10 user state data 11 from each of the persons B, C, D.

More specifically, the person-specific training sample database 6 associated with the user comprises a first set of person specific training samples 6.1 including interaction data for the user, the interactions involving the first person B, user state data of the user, and user state data 11.1 of the first person B. Similarly, the second set of person specific training samples 6.2 includes interaction data for the user, the interactions involving the second person C, user state data of the user, and user state data 11.2 of the second person C. The third set of person specific training samples 6.3 includes interaction data for the user, the interactions involving the third person D, user state data of the user, and user state data 11.3 of the third person D.

The person-specific interaction opportunity classifier module 7 includes classifier data comprising person-specific interaction opportunity classifiers 7.1, 7.2, 7.3, which are trained using the first, second, and third set of person specific training samples 6.1, 6.2, 6.3, respectively.

For example, the person-specific interaction opportunity classifier 7.1 learns based on the first person-specific training data sample 6.1. The person-specific interaction opportunity classifier 7.1 is therefore trained to provide a first mutual interaction score 13.1 for an interaction between the user (person A) and the person B, based on current user state data of the user and based on current user state data 12.1 of the person B. Accordingly, the predicted first mutual interaction score 13.1 provides a more comprehensive decision measure for deciding on a social interaction between the user and the person B, as both user states of the user and the person B are taken into regard. A recommended or initiated action will accordingly have an increased probability of success as both, an initiator of the interaction (user, person A) and an addressee (person B) of the interaction are regarded and influence the predicted interaction score 13.1. The predicted interaction score 13.1 is provided to the opportunity selection module 8, which generates an interaction identifier based thereon. The interaction identifier may then be provided to the respective HMI 9 associated with the user A.

Alternatively or additionally, the generated interaction identifier may be provided to the HMI 9.1 associated with person B Additionally, the generated interaction identifier may further be provided to the HMI 9.2 associated with person C and/or to the HMI 9.3 associated with person D.

The second mutual interaction score 13.2 for an interaction between the user (person A) and the person C, based on current user state data of the user A and further based on current user state data 12.2 of the person C may be predicted in a corresponding manner to the first mutual interaction score 13.1 for an interaction between the user A and the person B.

The third mutual interaction score 13.3 for an interaction between the user A and the person D, based on current user state data of the user and further based on current user state data 12.3 of the person D may be predicted a corresponding manner to the first mutual interaction score 13.1 for an interaction between the user A and the person B.

The predicted second and third interaction scores 13.2, 13.3 offer a corresponding advantageous and comprehensive decision measure for deciding on a social interaction between the user A and the person C, and the user A and the person D respectively.

Figure 3:
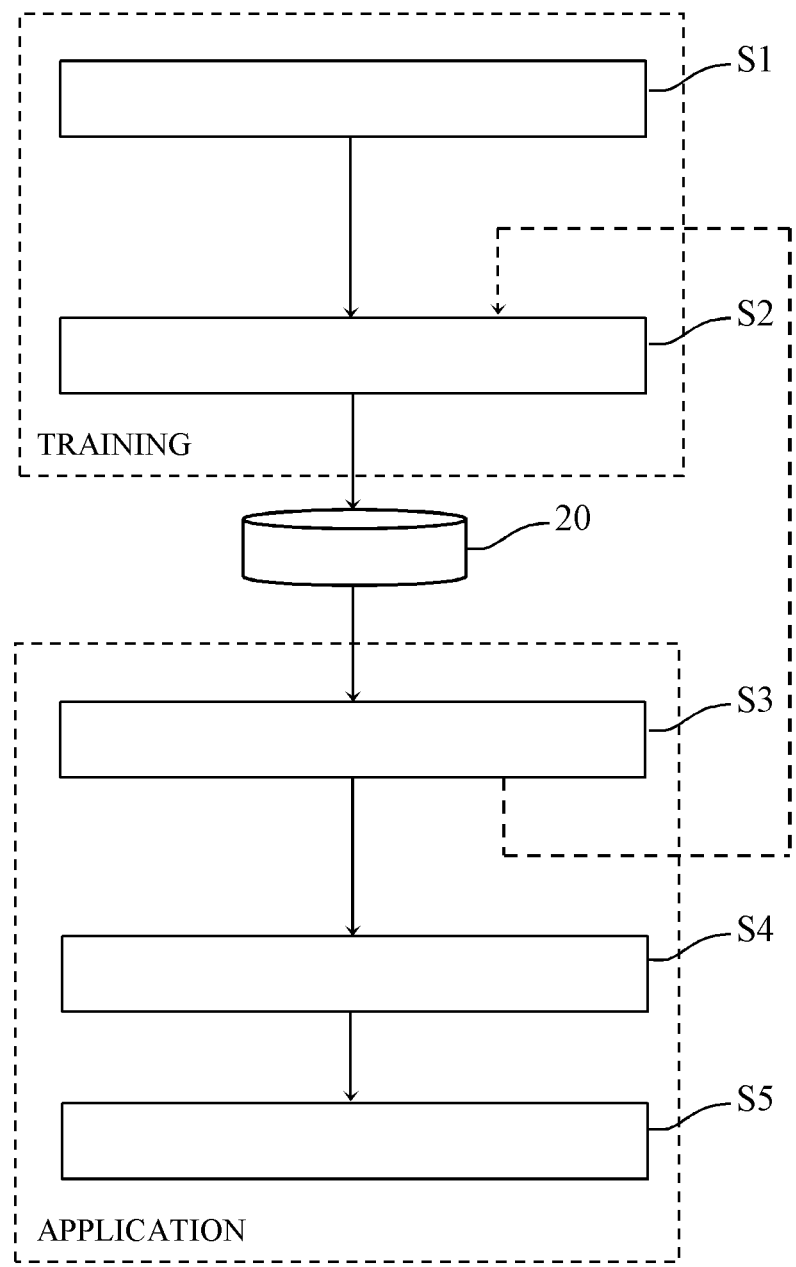
FIG. 3 shows a flowchart of the method according to an exemplary embodiment of the present disclosure.

FIG. 3 shows a simplified flowchart of the method for improving an interaction process in a social network for a user with at least one other person according to an exemplary embodiment. FIG. 3 illustrates the method being performed in a training phase and a subsequent application phase.

The training phase starts with step S1, in which sensor data on at least a user state and interaction data on a social interaction of a human person with the at least one other person B, C, D is acquired. The acquired sensor data on the user state includes at least sensor data on the user state of the at least one other person B, C, D. The acquired sensor data on the user state may further include sensor data on the user state of the user (person A).

Step S1 may also include a sub-step of inferring the user state of the at least one other person B, C, D and the user from the acquired sensor data.

In step S2, the acquired sensor data and the interaction data is analyzed. The analysis of the acquired sensor data and the acquired interaction data generates classifier data. The generated classifier data is subsequently stored in the memory 20.

In the application phase, in step S3 current sensor data on at least the user state of the at least one other person B, C, D is acquired.

In step 4, an interaction score for the user A, based on the acquired current sensor data and the generated classifier data, is predicted.

In step S5 following to step S4, an interaction identifier for the user A for an interaction with the at least one other person B, C, D in the social network is generated based on the predicted interaction score.

In step S6, the HMI 9 recommends to the user A an interaction on the social network based on the interaction identifier. Alternatively or additionally, the HMI 9 directly initiates an interaction of the user A with at least one other person B, C, D on the social network based on the interaction identifier.

FIG. 4 shows an exemplary structure of the system 1, 1' according to an exemplary embodiment of the present disclosure. System 1, 1' includes plural electronic communication devices 15, 16, 17, 18, which are capable to communicate over the network 10. Each electronic communication device 15, 16, 17, 18 of the plurality of electronic communication devices 15, 16, 17, 18 is associated with one person A, B, C, D. Communication modules 23 of the electronic communication devices 15, 16, 17, 18 enable a communication between each pair of the electronic communication devices 15, 16, 17, 18 (peer-to-peer communication), a communication from one of the electronic communication devices 15, 16, 17, 18 to two or more of the electronic communication devices 15, 16, 17, 18 (multicast communication) and a communication from one of the electronic communication devices 15, 16, 17, 18 to all other electronic communication devices 15, 16, 17, 18 (broadcast communication).

Further, the network 10 may also enable communication from each of the electronic communication devices 15, 16, 17, 18 to the server 19 using the communication module 23. The server 19 may access a data storage device (memory) 20 for storing data to the data storage device 20 and reading data from the data storage device 19.

Each of the electronic communication devices 15, 16, 17, 18 comprises a processor 21 (computing unit, local computing unit) and a memory 22 (storage unit, local storage unit) for storing data locally.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A method for improving an interaction process of a user in a social network with at least one other person, the method comprising steps of:

in a training phase,
acquiring sensor data on at least a user state of the at least one other person and interaction data on a social interaction of the user with the at least one other person, wherein the acquired sensor data concerns at least one of user activity and user emotion of the at least one other person, analyzing the sensor data and the interaction data to generate classifier data from the acquired sensor data and the acquired interaction data, wherein analyzing the sensor data and the interaction data comprises learning a correlation between the acquired sensor data and the acquired interaction data for generating the classifier data, and the generated classifier data comprises a learned classifier for the user and the at least one other person, wherein the learned classifier determines an interaction initiation success for the user and the at least one other person, or the learned classifier determines an interaction initiation or an initiation acceptance success for the user and the at least one other person, and in an application phase,
acquiring current sensor data on at least a current user state of the at least one other person, wherein the acquired current sensor data concerns at least one of user activity and user emotion of the at least one other person, predicting an interaction score for the user based on the acquired current sensor data and the classifier data, generating an interaction identifier for the at least one other person for an interaction with the at least one other person in the social network based on the predicted interaction score.

2. The method according to claim 1, wherein
the acquired sensor data and the acquired current sensor data further comprise user location.

3. The method according to claim 1, wherein
the acquired interaction data includes at least one of information on an initiated interaction on the social network, acceptance of the initiated interaction on the social network, and rejection of the initiated interaction on the social network.

4. The method according to claim 1, wherein
acquiring the sensor data comprises acquiring sensor data on a user state of the user and further acquiring sensor data on at least the user state of the at least one other person, and
acquiring the current sensor data comprises acquiring sensor data on a current user state of the user and further acquiring sensor data on the current user state of the at least one other person.

5. The method according to claim 4, wherein, in the training phase, the method further comprises steps of
generating a generic model,
learning an adaptation function based on the generic model and the acquired sensor data on the user state of the user and the interaction data on the social interaction of the user with the at least one other person, and, in the step of analyzing the sensor data,
generating the classifier data based on the learned adaptation function and the generic model.

6. The method according to claim 1, wherein
acquiring the sensor data includes acquiring the sensor data from at least one sensor of at least one of a wearable device, a mobile processing device, a mobile communication device, and of a smart home system.

7. The method according to claim 1, wherein
the predicted interaction score includes at least a binary prediction value or a confidence value for a predicted interaction to occur.

8. The method according to claim 1, wherein,
in the training phase,
the acquired sensor data includes further sensor data on the at least one other person's user state and/or global information, and
in the application phase,
the acquired current sensor data includes further current sensor data on the at least one other person's user state and/or global information.

9. The method according to claim 1, wherein the method is
performing the steps of acquiring sensor data and analyzing the acquired sensor data in the training phase offline, and the method further performs storing the acquired sensor data and the classifier data offline.

10. The method according to claim 1, wherein the method is
performing the steps of acquiring sensor data and analyzing the acquired sensor data in the training phase online, and the method further performs updating the classifier data based on at least the acquired current sensor data and current interaction data.

11. The method according to claim 10, wherein the method is
performing the step of analyzing the acquired current sensor data to generate updated classifier data by unsupervised learning, in particular clustering based learning, or by an active learning method, in particular reinforcement learning.

12. The method according to claim 1, wherein the method further comprises a step of
predicting a future user state of the user and/or the at least one other person, and wherein the method is
predicting the interaction score for the user based on the acquired current sensor data, the classifier data and further based on the predicted future state.

13. The method according to claim 1, wherein the method further comprises at least one of steps of
providing, to the user, an interface presenting learned classifier data and accepting a user feedback on the presented learned classifier data via the interface,
providing, to the user, the interface for inputting further classifier data, and
providing, to the user, the interface for specifying the at least one other person for which the interaction identifier is to be generated based on the classifier data.

14. The method according to claim 1, wherein the method further comprises a step of
outputting, to the user, an interaction recommendation based on the generated interaction identifier, or
initiating directly an interaction between the user and the at least one other person on the social network based on the generated interaction identifier.

15. The method according to claim 1, wherein the method further comprises a step of
estimating a current user state based on the acquired current sensor data at a local processing device or at a remote processing device linked to the local processing device via a cloud service.

16. The method according to claim 15, wherein
the classifier data is stored in a memory of the local processing device of the user, in a memory of a processing device of the at least one other person, or in a server memory of the remote processing device.

17. The method according to claim 16, wherein
the classifier data differentiates different types of interactions in the social network,
wherein the different types of interactions include at least one of interaction duration, interaction content, interaction target, and a communication service.

18. The method according to claim 1, wherein
the steps of predicting the interaction score and of generating the interaction identifier are performed locally at the user's processing device and provided to a processing device associated with the at least one other person for initiating the interaction, or
the steps of predicting the interaction score and of generating the interaction identifier are performed by a remote processing device and provided to the processing device associated with the user for initiating the interaction, or
the steps of predicting the interaction score and of generating the interaction identifier are performed locally at the user's processing device based on sensor data provided by the processing device associated with the at least one other person.

19. A non-transitory computer-readable recording medium having computer-readable program stored thereon which, when executed, cause a computer or digital signal processor to perform a method for improving an interaction process of a user in a social network with at least one other person, the method comprising steps of:

in a training phase,
acquiring sensor data on at least a user state of the at least one other person and interaction data on a social interaction of the user with the at least one other person, wherein the acquired sensor data concerns at least one of user activity and user emotion of the at least one other person,
analyzing the sensor data and the interaction data to generate classifier data from the acquired sensor data and the acquired interaction data,
wherein analyzing the sensor data and the interaction data comprises learning a correlation between the acquired sensor data and the acquired interaction data for generating the classifier data, and the generated classifier data comprises a learned classifier for the user and the at least one other person,
wherein the learned classifier determines an interaction initiation success for the user and the at least one other person, or the learned classifier determines an interaction initiation or an initiation acceptance success for the user and the at least one other person, and
in an application phase,
acquiring current sensor data on at least a current user state of the at least one other person, wherein the acquired current sensor data concerns at least one of user activity and user emotion of the at least one other person,
predicting an interaction score for the user based on the acquired current sensor data and the classifier data,
generating an interaction identifier for the at least one other person for an interaction with the at least one other person in the social network based on the predicted interaction score.

20. A system for improving an interaction process of a user in a social network with at least one other person, the system comprising:

a processor;
a memory;
a human interaction interface; and
a data acquisition interface for acquiring sensor data from at least one sensor;
wherein the data acquisition interface is configured to acquire the sensor data on at least a user state of the at least one other person and interaction data on a social interaction of the user with the at least one other person, wherein the acquired sensor data concerns at least one of user activity and user emotion of the at least one other person;
the processor is configured to analyze the acquired sensor data and the acquired interaction data to generate classifier data from the acquired sensor data and the acquired interaction data, and to store the classifier data in the memory, wherein analyzing the sensor data and the acquired interaction data comprises learning a correlation between the acquired sensor data and the acquired interaction data for generating the classifier data, and the generated classifier data comprises a learned classifier for the user and the at least one other person,
wherein the learned classifier determines an interaction initiation success for the user and the at least one other person, or the learned classifier determines an interaction initiation or an initiation acceptance success for the user and the at least one other person; and
the processor is further configured to acquire current sensor data on at least a current user state of the at least one other person, wherein the acquired current sensor data concerns at least one of user activity and user emotion of the at least one other person;
to predict an interaction score for the user based on the acquired current sensor data and the classifier data stored in the memory; and
to generate an interaction identifier for the at least one other person for an interaction with the at least one other person in the social network based on the predicted interaction score.

* * * * *